United States Patent
Mauri

(10) Patent No.: US 6,890,121 B2
(45) Date of Patent: May 10, 2005

(54) DEVICE FOR JOINING TOGETHER TWO PARTS ARRANGED AT 90 DEGREES WITH RESPECT TO EACH OTHER

(75) Inventor: Gaetano Mauri, Lecco (IL)

(73) Assignee: F. LLI Mauri S.r.l., Garlate (IT)

( * ) Notice: Subject to any disclaimer, the term of this patent is extended or adjusted under 35 U.S.C. 154(b) by 34 days.

(21) Appl. No.: 10/718,811

(22) Filed: Nov. 24, 2003

(65) Prior Publication Data

US 2004/0208690 A1 Oct. 21, 2004

(30) Foreign Application Priority Data

Apr. 17, 2003 (IT) ..................................... MI2003A0799

(51) Int. Cl.[7] ............................................... F18B 17/00
(52) U.S. Cl. .................... 403/231; 403/382; 403/230
(58) Field of Search ................................ 403/230, 231, 403/403, 382

(56) References Cited

U.S. PATENT DOCUMENTS

| | | | | |
|---|---|---|---|---|
| 4,693,630 A | * | 9/1987 | Giovannetti | ................ 403/231 |
| 4,956,956 A | | 9/1990 | Maier et al. | |
| 5,667,327 A | * | 9/1997 | Salice | .......................... 403/231 |
| 5,762,442 A | * | 6/1998 | Salice | .......................... 403/231 |
| 5,772,353 A | * | 6/1998 | Grieser et al. | .............. 403/231 |

FOREIGN PATENT DOCUMENTS

| | | |
|---|---|---|
| DE | 30 36 560 | 5/1982 |
| DE | 31 46 805 | 6/1983 |

* cited by examiner

Primary Examiner—John Cottingham
(74) Attorney, Agent, or Firm—Dykema Gossett PLLC

(57) ABSTRACT

Device for joining together, in a longitudinal direction (X—X), two parts arranged at 90° with respect to each other, comprising a head integral with one of the two parts to be joined, a pin integral with the other of the said parts to be joined, the head having, arranged inside it, a gearing able to be actuated in a direction (Y—Y) perpendicular to the longitudinal joining direction and operate the pin so to determine joining together of the two parts in the longitudinal direction (X—X).

17 Claims, 2 Drawing Sheets

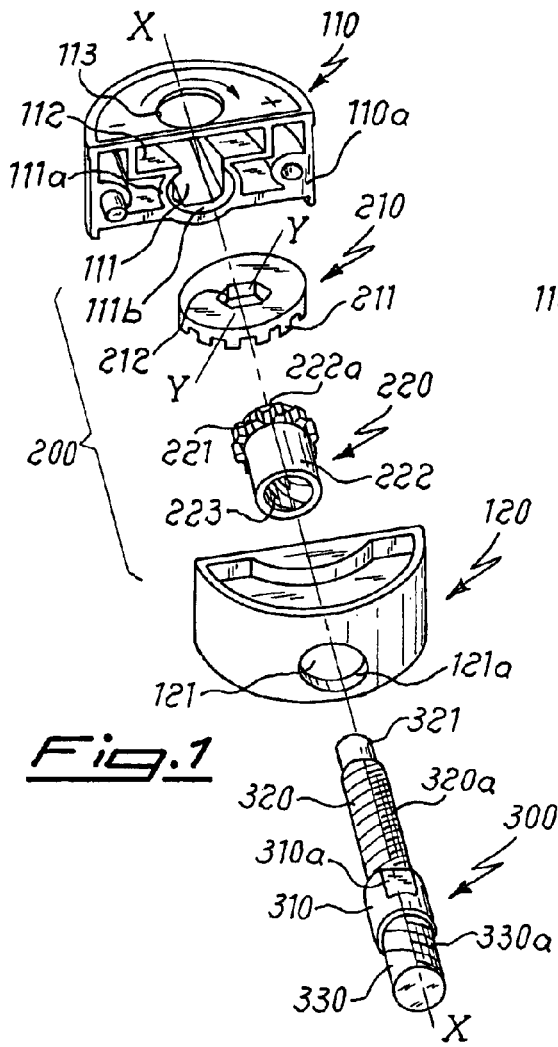
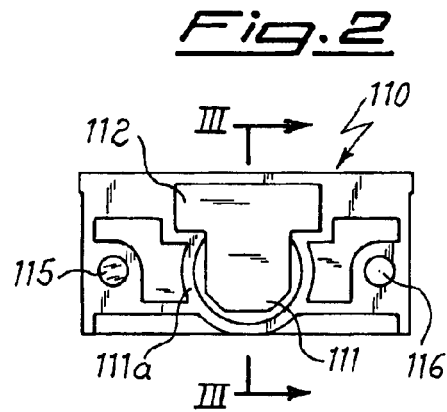
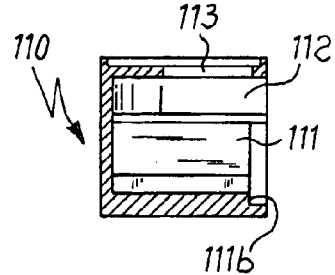
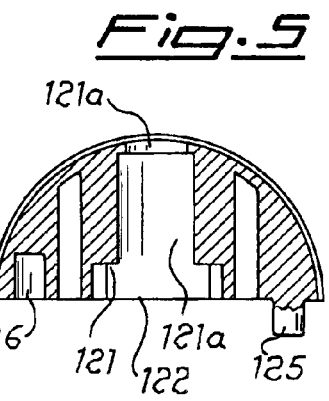
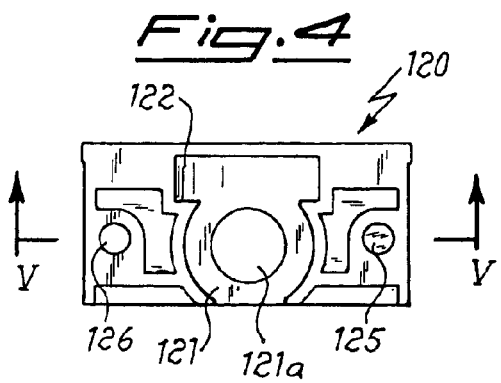

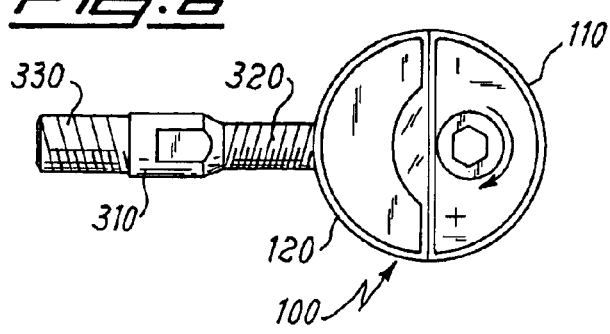
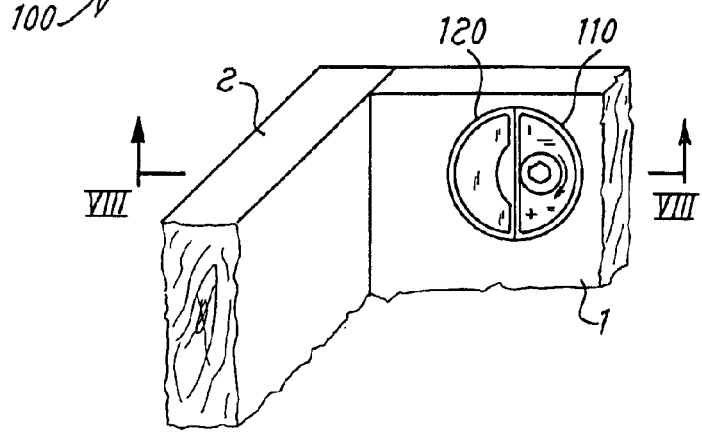
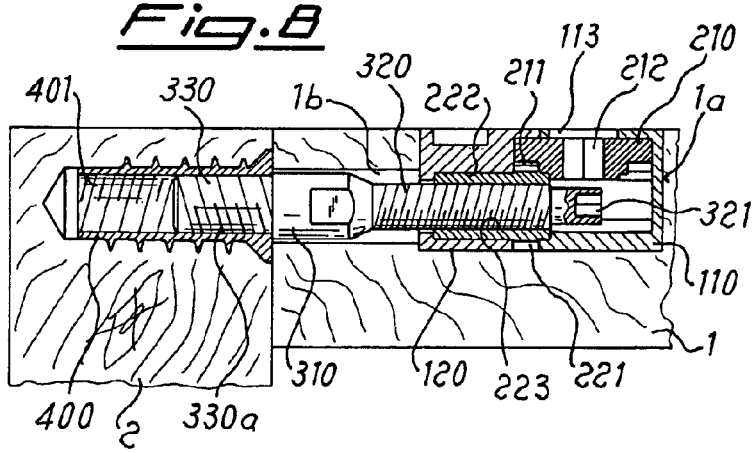
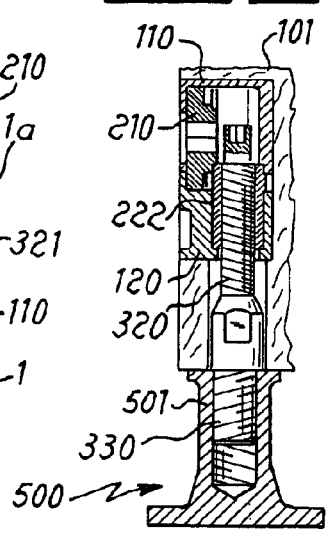

DEVICE FOR JOINING TOGETHER TWO PARTS ARRANGED AT 90 DEGREES WITH RESPECT TO EACH OTHER

BACKGROUND OF INVENTION a. Field of Invention

The present invention relates to a device for joining two parts together in a longitudinal direction, the parts being arranged at 90° with respect to each other.

b. Description of Related Art

In the furniture goods sector, there exists the need to assemble furniture, such as cabinets, chests of drawers and the like using flat components such as side pieces, cross pieces and the like, which must be fastened together in a relative position at right angles in order to ensure that the piece of furniture is set squarely once assembled.

In order to obtain stable fastening between the various parts, screw or female thread means are widely used, and essentially consist of a cylindrical element which is concealingly inserted inside a corresponding seat of one of the two parts and which forms the element reacting against the head of a screw which passes through the cylindrical element and, being screwed onto the female thread of a bush integral with the other part of the furniture, causes the two parts to be pulled together so as to come into contact with each other, and thus remain fastened together.

Although performing their function, these connecting devices nevertheless have drawbacks in that the head of the screw is never accessible from a direction perpendicular to the action of the thread/female thread connection, thus rendering operation of the screw by means of the corresponding tool somewhat difficult.

Additionally, the precision of the squared connection of the two parts is strictly dependent upon the precision of the design measurements of the various parts, including the receiving seats provided on the furniture. This results in unpredictability in the precision and correct squared alignment of the parts.

The technical problem which is posed, therefore, is that of providing a device which is able to allow correct joining together, at an angle of 90°, of two parts. Such parts may include for example the components of a piece of furniture or the like, which must be easily accessibility for insertion of a tool and operation by the user.

In addition to this, the device is required to ensure that joining together is substantially independent of the precision with which the various parts to be joined are made, including the relative distances between the seats provided therein for housing the various parts forming the joining device.

Within the context of this problem, the device should have limited dimensions, should be easy to manufacture and assemble, and should be compatible with the seats provided in the parts to be fastened together.

SUMMARY OF INVENTION

These results are obtained according to the present invention by a device for joining together, in a longitudinal direction, two parts arranged at 90° with respect to each other, which includes a head integral with one of the two parts to be joined, a pin integral with the other of the parts to be joined, the head having, arranged inside it, a gearing able to be actuated in a direction perpendicular to the longitudinal joining direction and operate the pin so as to determine joining together of the two parts in the longitudinal direction.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1 shows an exploded view of the device according to the invention;

FIG. 2 shows a front facing view of one of the half-heads forming the device according to FIG. 1;

FIG. 3 shows a schematic cross-section along a plane indicated by section III—III in FIG. 2;

FIG. 4 shows a front facing view of the other half-head forming the device according to FIG. 1;

FIG. 5 shows a schematic cross-section along a plane indicated by section V—V in FIG. 4;

FIG. 6 shows a top plan view of the assembled device;

FIG. 7 shows a schematic perspective view of two walls of a cabinet joined together by means of the device according to the present invention;

FIG. 8 shows a schematic cross-section along the plane indicated by section VIII—VIII in FIG. 7; and FIG. 9 shows a further example of application of the device according to the present invention.

DETAILED DESCRIPTION OF THE PREFERRED EMBODIMENTS

As illustrated, the device according to the present invention is essentially composed of a cylindrical head 100 which, during use, is fixed to first part 1 to be fastened to the other part 2 of furniture. The head includes two half-heads 110 and 120, respectively, each of which houses internally therein a corresponding part 210 and 220 of a gearing 200 able to be engaged with a pin 300, a part 330 of which is in turn able to be engaged with corresponding means 400 integral with part 2 to be brought up against part 1 of the furniture.

For the sake of convenience of the description a longitudinal axis X—X of the device and a transverse axis Y—Y perpendicular to the former will be identified.

In greater detail, first half-head 110 has therein a first coaxial seat 111 which is open towards the flat front side 110a of half-head 110 and blind towards the opposite end coinciding with the curved side surface of the said half-head. Front edge 111a of seat 111 has an undercut portion 11b, the function of which will be discussed in detailed below.

A second seat 112 is formed inside half-head 110 and is arranged along a horizontal plane (with an orientation not limited to that shown in the figures) and intersects longitudinal seat 111 so that the two recesses are open and communicate with each other along the intersecting plane over the whole axial length of the seats.

Second seat 112 opens outwardly by means of a hole 113 formed in the upper front surface of half-head 110.

Second recess 112 houses partially inside it a toothed wheel 210 which has teeth 211 extending from one side of wheel 210 parallel to the axis of rotation Y—Y thereof and along the whole circumference of the wheel.

The side of the wheel opposite to that of the teeth is provided with a seat 212 shaped according to one or more cross-like/hexagonal profiles or the like of corresponding operating spanners (not shown).

Wheel 210 forms the first part of a 90° gearing, the other part 220 of which is formed by a toothed rim 221 formed annularly on the external surface of a coaxial tube 222 which is also provided with a female thread 223.

Toothed rim 221 is axially arranged at a certain distance from the edge of tube 222 so as to define axial section 222a thereof able to be coaxially inserted in first longitudinal seat 111 of half-head 110.

Second half-head 120 has in turn first seat 121 passing through the curved side surface of half-head 120 via longitudinal hole 121a open on both sides and able to house tube 222.

Half-head 120 has, formed inside it, second seat 122 arranged along a horizontal plane (with an orientation not limited to that shown in the figures) tangential to longitudinal seat 121. Second recess 122 extends towards the inside of half-head 120 only over a short axial distance sufficient for containing toothed wheel part 211 projecting from seat 112 of first half-head 110.

Both half-heads 110, 120 have an opposite flat surface provided with a respective pin 115, 125 projecting axially outwards, and a corresponding centering hole 116, 126 suitable for engagement with the corresponding pin of the other half-head.

The device is completed by pin 300 which includes a cylindrical central section 310 on the side surface of which smoothed zones 310a form elements enabling insertion of an operating spanner. A first shank 320 extends longitudinally on one side of the cylindrical section and includes threading 320a able to engage with female thread 223 of tube 222. The free end part of the first shank is formed as an inset hexagonal part 320 suitable for engagement with a corresponding operating spanner (not shown). A second shank 330 extends on the opposite side to first shank 320 relative to central section 310 and includes a thread 330a suitable for engagement with a female thread 401 of a bush 400 (FIG. 8) integral with one of the two furniture parts to be fastened together.

In a particular embodiment, the pitch of thread 330a of second threaded shank 330 is greater than the pitch of thread 320a of the first shank 320 of pin 300.

The operating principle of the device will now be discussed in detail.

Head 100 may be assembled by inserting toothed wheel 210 in associated seat 112 of first half-head 110, inserting tube 220 in associated axial seat 121 of half-head 120, and joining frontally, in the longitudinal direction, two half-heads 110 and 120 by means of pins 115, 125 and corresponding centring holes 116, 126. This enables annular teeth 221 of tube 222 to enter axially into contact with undercut portion 111b of axial seat 111 and radially into meshing engagement with teeth 211 of toothed wheel 210. Bush 400 is then inserted into part 2 of the furniture and second threaded shank 330 of pin 300 is screwed fully into female thread 401 of the bush, using a suitable spanner engaged with inset hexagonal part 321 of other shank 320 or with central section 310, 310a of the pin, until the latter is locked to bush 400 and therefore to part 2. Head 100 is then inserted into the corresponding hole 1a provided in other part 1 to be fastened so that through-hole 121a is aligned with the corresponding hole 1b of part 1. The two parts 1 and 2 are moved towards each other so that first threaded shank 320 engages with female thread 223 of tube 222. A corresponding spanner is engaged with seat 212 so as to operate toothed wheel 210, causing rotation thereof and transmission of the movement to teeth 221 of tube 222 which starts to rotate about the longitudinal axis. Rotation of tube 222, which is axially fixed, causes, by means of the connection between female thread 223 and screw 320a of shank 320, coaxial displacement of pin 300 towards head 100 inside which it may penetrate by means of coaxial seat 111 of half-head 110. The displacement of the pin draws with it bush 400 and therefore part 2 towards part 1, resulting in mutual fastening thereof.

It is therefore obvious how the device according to the invention allows operation of the gearing actuating pin 300 in a direction perpendicular to head 100 of the device and therefore perpendicular to the direction of relative displacement of the two parts to be joined together, thus ensuring great ease and precision of operation.

In addition to this, owing to the possibility for pin 300 to penetrate inside head 100 over a considerable longitudinal distance, it is possible to take up a large amount of play which may arise in imprecision in machining of the seats housing the device in the parts to be joined.

Finally, it should be noted how the device according to the present invention allows a very high locking force to be applied to the pin.

According to the present invention, it is envisaged moreover that the device may be advantageously used as an element for adjusting the level position of objects having several resting points.

For example, as illustrated in FIG. 9, it is possible to engage second threaded shank 330 of pin 300 with bush 400 inserted in/forming part of an upright 501 of an end foot 500 of element 101 which may consist of a table leg or the bottom edge—resting on the ground—of an In this configuration, operating frontally, toothed wheel 210 results in adjustment of the height of foot/upright 500 and therefore level positioning of the associated structure.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A device for joining together, in a generally longitudinal direction (X—X), two parts arranged at approximately 90° with respect to each other, said device comprising a head integral with one of the two parts to be joined, a pin integral with the other of the parts to be joined, said head has, arranged inside it, gearing able to be actuated in a direction (Y—Y) generally perpendicular to the generally longitudinal joining direction and operate said pin for joining together the two parts in the generally longitudinal direction (X—X), wherein said gearing comprises a toothed wheel which has teeth extending from one side of the toothed wheel generally parallel to the axis of rotation (Y—Y) thereof and along the circumference of the toothed wheel, said gearing further comprises a toothed rim annularly formed on an external surface of a coaxial tube which is also provided with an internal female thread, and wherein said pin comprises a cylindrical central section, a first shank extending generally longitudinally from one side of said cylindrical section and provided with a thread able to engage with the female thread of the tube and a second shank extending on the opposite side to the first shank relative to the central section and in turn provided with a further thread.

2. A device according to claim 1, wherein said head is formed by a first half-head and by a second half-head which can be joined together by means of associated coupling elements and corresponding centering seats.

3. A device according to claim 2, wherein the first half-head has inside it a first longitudinal seat which is open towards a flat front side of the half-head and blind towards an opposite end coinciding with a curved side surface of said half-head.

4. A device according to claim 3, wherein a front edge of the seat has an annular undercut portion.

5. A device according to claim 2, in that wherein the first half-head has, formed inside it, a second seat arranged along a horizontal plane and intersecting a longitudinal seat so that two recesses are open and communicate with each other along an axial extension of said seats.

6. A device according to claim 5, wherein said second seat opens outwards by means of a hole with an axis perpendicular to the longitudinal direction (X—X), formed in an upper front surface of the half-head.

7. A device according to claim 2, wherein said second half-head has a first seat passing through a curved side surface of the halfhead via a hole coaxial with the longitudinal direction (X—X).

8. A device according to claim 2, wherein said second half-head has a second seat arranged along a horizontal plane and tangential to said first seat.

9. A device according to claim 8, wherein said second seat extends towards an inside of the second half-head only over a short axial distance.

10. A device according to claim 1, wherein said toothed wheel has an actuating seat formed on a side of the wheel opposite to that of the teeth.

11. A device according to claim 10, wherein said actuating seat has a profile shaped according to one or more cross-like/hexagonal profiles of corresponding operating spanners.

12. A device according to claim 1, wherein said toothed rim is axially arranged at a predetermined distance from an edge of the tube so as to define an axial section thereof able to be coaxially inserted inside a first longitudinal seat of a half-head.

13. A device according to claim 1, wherein a free end part of said first shank is formed as an inset hexagonal part suitable for engagement with a corresponding operating spanner.

14. A device according to claim 1, wherein smoothed zones able to form elements for engagement with an operating spanner are provided on a side surface of said central part.

15. A device according to claim 1, wherein said further thread of the second shank is suitable for engagement with a female thread of a bush integral with one of the two parts to be fastened together.

16. A device according to claim 1, wherein the pitch of the further thread of the second threaded shank is greater than the pitch of the thread of the first shank of the pin.

17. Use of the device according to claim 1 for adjusting the level position of a furniture element.

* * * * *